US012531079B2

(12) United States Patent
Donley et al.

(10) Patent No.: US 12,531,079 B2
(45) Date of Patent: Jan. 20, 2026

(54) OWN-VOICE SUPPRESSION IN WEARABLES

(71) Applicant: Meta Platforms Technologies, LLC, Menlo Park, CA (US)

(72) Inventors: Jacob Ryan Donley, Issaquah, WA (US); Vladimir Tourbabin, Woodinville, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 101 days.

(21) Appl. No.: 18/611,667

(22) Filed: Mar. 20, 2024

(65) Prior Publication Data

US 2024/0331713 A1 Oct. 3, 2024

Related U.S. Application Data

(60) Provisional application No. 63/454,902, filed on Mar. 27, 2023.

(51) Int. Cl.
*G10L 21/0208* (2013.01)
*G10L 25/93* (2013.01)

(52) U.S. Cl.
CPC .......... *G10L 21/0208* (2013.01); *G10L 25/93* (2013.01)

(58) Field of Classification Search
CPC ................. G10L 21/0208; G10L 25/93; G10L 2021/02087; G10L 2021/02166; H04R 3/005; H04R 1/406; H04R 5/033; H04R 2430/23; H04S 7/302; H04S 2400/15; H04S 2420/01
See application file for complete search history.

(56) References Cited

U.S. PATENT DOCUMENTS 9,860,656 B2 1/2018 Jensen et al.
10,631,102 B2 4/2020 Jensen et al.
11,533,554 B2 12/2022 Hoang et al.
(Continued)

FOREIGN PATENT DOCUMENTS

CN 113763984 A 12/2021

OTHER PUBLICATIONS

European Search Report for European Patent Application No. 24166198.2, dated Jun. 6, 2024, 3 pages.
(Continued)

*Primary Examiner* — Yogeshkumar Patel
(74) *Attorney, Agent, or Firm* — Greenberg Traurig, LLP

(57) ABSTRACT

Techniques are described for own-voice suppression using separate sound filters. Sound from a local area is captured using an acoustic sensor array. The captured sound includes noise from the local area and the user's voice. A first set of statistical properties associated with the noise and a second set of statistical properties associated with the user's voice are determined. A first sound filter is generated based on a target transfer function and both sets of statistical properties. A second sound filter is generated based on the target transfer function and the second set of statistical properties, but not the first set of statistical properties. The first sound filter and the second sound filter are applied to different parts of an audio signal generated based on the captured sound, thereby forming audio content in which the user's voice is suppressed for presentation of the audio content to the user.

20 Claims, 7 Drawing Sheets

(56) References Cited

U.S. PATENT DOCUMENTS

| | | | | |
|---|---|---|---|---|
| 2021/0297789 | A1* | 9/2021 | De Haan | G10L 21/0216 |
| 2021/0345047 | A1* | 11/2021 | Sabin | H04R 25/505 |
| 2023/0083192 | A1* | 3/2023 | Hoang | H04R 25/405<br>381/71.1 |

OTHER PUBLICATIONS

Marcos D., "How to stop hearing yourself through gear headset" https://recording-voice.com/how-to-stop-hearing-yourself-through-gear-headset/, downloaded from the Internet on Jul. 1, 2023, 5 pages.

Office Action mailed Oct. 24, 2025 for European Patent Application No. 24166198.2, filed on Mar. 26, 2024, 8 pages.

* cited by examiner

OWN-VOICE SUPPRESSION IN WEARABLES

CROSS-REFERENCE TO RELATED APPLICATIONS

This application claims the benefit of U.S. Provisional Application No. 63/454,902, filed Mar. 27, 2023, which is incorporated by reference herein in its entirety for all purposes.

FIELD OF THE INVENTION

The present disclosure generally relates to suppressing a voice, and specifically relates to own-voice suppression in wearables.

BACKGROUND

Conventional headsets may enhance a far-field talker but also tend to amplify a voice of a user of the headset. The resulting amplification of the user's voice back to the user can be jarring and reduce the quality of the user's listening experience.

SUMMARY

Described herein is an audio system and corresponding techniques for controlling the audio system to enhance sound from a target sound source, and also suppress a user's own voice, when presenting audio content to the user. The audio system may be integrated into a wearable device. The wearable device may be, e.g., a headset, an in-ear device, a wristwatch, etc. The audio system may generate the audio content using separate sound filters (e.g., spatial filters). The sound filters can be generated through tracking statistical properties (e.g., spatial covariance across an acoustic sensor array) associated with ambient noise and statistical properties associated with the user's voice.

In some embodiments, a method of own-voice suppression includes capturing sound from a local area using an acoustic sensor array of a headset, the captured sound including noise from the local area and a voice of a user of the headset. The method further includes determining a first set of statistical properties associated with the noise, based on portions of the captured sound that do not include the voice of the user; and determining a second set of statistical properties associated with the voice of the user, based on portions of the captured sound that include the voice of the user. The method further includes generating a first sound filter based on a target transfer function, the first set of statistical properties, and the second set of statistical properties; and generating a second sound filter based on the target transfer function and the second set of statistical properties, but not the first set of statistical properties. The method further includes applying the first sound filter and the second sound filter to different parts of an audio signal, generated based on the captured sound, to form audio content in which the voice of the user is suppressed; and presenting the audio content to the user.

In some embodiments, the method described in the preceding paragraph further includes at least one of the following features, either alone or in a combination of two or more features: (i) the target transfer function is an array transfer function (ATF) associated with a target sound source; (ii) estimating a direction of arrival of the target sound source in combination with determining the ATF based on the direction of arrival; (iii) the first set of statistical properties comprises a first covariance matrix representing a spatial covariance of the noise, and the second set of statistical properties comprises a second covariance matrix representing a spatial covariance of the voice of the user; (iv) generating the first sound filter comprises weighting the first set of statistical properties relative to the second set of statistical properties; (v) a weight of the second set of statistical properties used to generate the first sound filter is less than a weight of the second set of statistical properties used to generate the second sound filter, such that the voice of the user is less suppressed in a part of the audio signal to which the first sound filter is applied compared to a part of the audio signal to which the second sound filter is applied; (vi) the first sound filter and the second sound filter are applied during beamforming of signals produced by the acoustic sensor array; (vii) the first sound filter and the second sound filter are applied as post-filters after beamforming of signals produced by the acoustic sensor array; or (viii) the audio signal comprises a sequence of audio frames which include the voice of the user, the first sound filter is applied to a first set of frames in the sequence of audio frames, and the second sound filter is applied to a second set of frames in the sequence of audio frames, the second set of frames being located before or after the first set of frames.

In some embodiments, an audio system includes an acoustic sensor, a transducer array, and an audio controller. The acoustic sensor array is configured to capture sound from a local area, the captured sound including noise from the local area and a voice of a user. The audio controller is configured to determine a first set of statistical properties associated with the noise, based on portions of the captured sound that do not include the voice of the user; and determine a second set of statistical properties associated with the voice of the user, based on portions of the captured sound that include the voice of the user. The audio controller is further configured to generate a first sound filter based on a target transfer function, the first set of statistical properties, and the second set of statistical properties; and generate a second sound filter based on the target transfer function and the second set of statistical properties, but not the first set of statistical properties. The audio controller is further configured to apply the first sound filter and the second sound filter to different parts of an audio signal, generated based on the captured sound, to form audio content in which the voice of the user is suppressed; and present the audio content to the user through the transducer array.

In some embodiments, the audio system described in the preceding paragraph further includes at least one of the following features, either alone or in a combination of two or more features: (i) the target transfer function is an array transfer function (ATF) associated with a target sound source; (ii) the audio controller is further configured to estimate a direction of arrival of the target sound source and determine the ATF based on the direction of arrival; (iii) the first set of statistical properties comprises a first covariance matrix representing a spatial covariance of the noise, and the second set of statistical properties comprises a second covariance matrix representing a spatial covariance of the voice of the user; (iv) to generate the first sound filter, the audio controller is configured to weight the first set of statistical properties relative to the second set of statistical properties; (v) a weight of the second set of statistical properties used to generate the first sound filter is less than a weight of the second set of statistical properties used to generate the second sound filter, such that the voice of the user is less suppressed in a part of the audio signal to which the first sound filter is applied compared to a part of the audio signal to which the second sound filter is applied; (vi) the audio controller is configured to apply the first sound filter and the second sound filter during beamforming of signals produced by the acoustic sensor array; (vii) the audio controller is configured to apply the first sound filter and the second sound filter as post-filters after beamforming of signals produced by the acoustic sensor array; or (viii) the audio signal comprises a sequence of audio frames which include the voice of the user, the audio controller is configured to apply the first sound filter to a first set of frames in the sequence of audio frames, and the audio controller is configured to apply the second sound filter to a second set of frames in the sequence of audio frames, the second set of frames being located before or after the first set of frames.

In some embodiments, a non-transitory computer-readable storage medium stores instructions which, when executed by one or more processors of an audio system, cause the audio system to capture sound from a local area using an acoustic sensor array, the captured sound including noise from the local area and a voice of a user. When executed, the instructions further cause the audio system to determine a first set of statistical properties associated with the noise, based on portions of the captured sound that do not include the voice of the user; and determine a second set of statistical properties associated with the voice of the user, based on portions of the captured sound that include the voice of the user. When executed, the instructions further cause the audio system to generate a first sound filter based on a target transfer function, the first set of statistical properties, and the second set of statistical properties; and generate a second sound filter based on the target transfer function and the second set of statistical properties, but not the first set of statistical properties. When executed, the instructions further cause the audio system to apply the first sound filter and the second sound filter to different parts of an audio signal, generated based on the captured sound, to form audio content in which the voice of the user is suppressed; and present the audio content to the user.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

The figures depict embodiments of the present disclosure for purposes of illustration only. One skilled in the art will readily recognize from the following description that alternative embodiments of the structures and methods illustrated may be employed without departing from the principles described herein.

DETAILED DESCRIPTION

Described herein is an audio system and corresponding methods for controlling the audio system to enhance (e.g., amplify) sound from a target sound source, and also suppress a user's own voice, when presenting audio content to the user. The audio system may be integrated into a wearable device. The wearable device may be, e.g., a headset, an in-ear device, a wristwatch, etc. The audio system may generate the audio content using separate sound filters (e.g., spatial filters). The sound filters can be generated through tracking statistical properties (e.g., spatial covariance across an acoustic sensor array) associated with ambient noise and statistical properties associated with the user's voice.

In some embodiments, the audio system tracks an ambient noise covariance independently of tracking an own-voice covariance and uses these covariances to generate spatial filters that mitigate amplification of the user's voice. The audio system may include a transducer array, an acoustic sensor array (sometimes referred to herein simply as a "sensor array"), and an audio controller. An example of such an audio system in shown in FIG. 2, discussed below. However, in other embodiments, the audio system may include different and/or additional components. Similarly, in some cases, functionality described with reference to components of the audio system can be distributed among the components in a different manner than is described here. For example, some or all of the functions of the audio controller may be performed by a remote server.

Figure 1A:
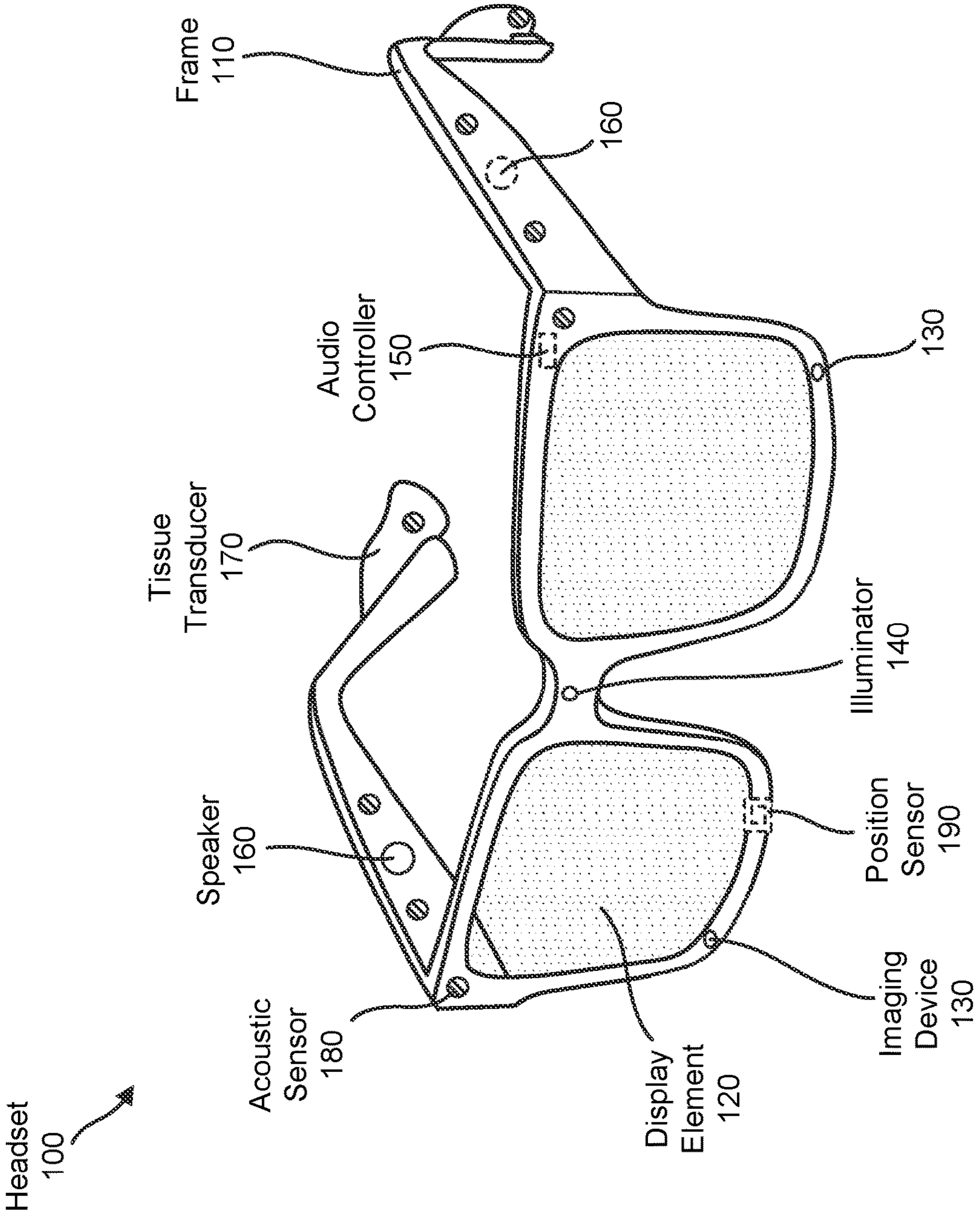
FIG. 1A is a perspective view of a headset implemented as an eyewear device, in accordance with one or more embodiments.

FIG. 1A is a perspective view of a headset 100 implemented as an eyewear device, in accordance with one or more embodiments. In some embodiments, the eyewear device is a near eye display (NED). In general, the headset 100 may be worn on the face of a user such that content (e.g., media content) is presented using a display assembly and/or an audio system, both of which are integrated into the headset 100. However, the headset 100 may also be used such that media content is presented to a user in a different manner. Examples of media content presented by the headset 100 include images, video, audio, or some combination thereof. The headset 100 includes a frame 110, a display assembly including one or more display elements 120, a depth camera assembly (DCA), an audio system, and a position sensor 190. While FIG. 1A illustrates the components of the headset 100 in example locations on the headset 100, the components may be located elsewhere on the headset 100 and/or on an external device paired with the headset 100. Similarly, the headset 100 may include fewer or more components than what is shown in FIG. 1A.

The frame 110 holds the other components of the headset 100. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., a temple tip or earpiece).

The one or more display elements 120 provide light to a user wearing the headset 100. As illustrated, the headset may include a separate display element 120 for each eye of the user. In some embodiments, a display element 120 generates image light that is directed to an eyebox of the headset 100. The eyebox is a location in space that an eye of user occupies while wearing the headset 100. For example, a display element 120 may be a waveguide display. A waveguide display includes a light source (e.g., a two-dimensional source, one or more line sources, one or more point sources, etc.) and one or more optical waveguides. Light from the light source is in-coupled into the one or more optical waveguides, which output the light in a manner such that there is pupil replication in an eyebox of the headset 100. In-coupling and/or outcoupling of light from the one or more optical waveguides may be done using one or more diffraction gratings. In some embodiments, the waveguide display includes a scanning element (e.g., a rotating mirror or prism) that scans light from the light source as it is in-coupled into the one or more waveguides. Note that in some embodiments, one or both of the display elements 120 are opaque and do not transmit light from a local area around the headset 100. The local area is the area surrounding the headset 100. For example, the local area may be a room that the user wearing the headset 100 is inside, or the user wearing the headset 100 may be outside and the local area is an outside area. When one or more display elements 120 are opaque, the headset 100 may generate virtual reality (VR) content. Alternatively, in some embodiments, one or both of the display elements 120 are at least partially transparent, such that light from the local area may be combined with light from the one or more display elements 120 to produce augmented reality (AR) and/or mixed reality (MR) content.

In some embodiments, a display element 120 does not generate image light, and instead is a lens that is optically transparent in order to transmit light from the local area to the eyebox. For example, one or both of the display elements 120 may be a lens without correction (non-prescription) or a prescription lens (e.g., single vision, bifocal, trifocal, or progressive) to help correct for defects in a user's eyesight. In some embodiments, the display element 120 may be polarized and/or tinted to protect the user's eyes from the sun.

In some embodiments, the display element 120 may include an additional optics block (not shown in FIG. 1A). The optics block may include one or more optical elements (e.g., a spherical lens, a Fresnel lens, etc.) that direct light from the display element 120 to the eyebox. The optics block may, for example, correct for aberrations in some or all of the image content, magnify some or all of the image, or some combination thereof.

The DCA determines depth information for a portion of a local area surrounding the headset 100. The DCA includes one or more imaging devices 130 and a DCA controller (not shown in FIG. 1A) and may also include an illuminator 140. The illuminator is a light source that illuminates a portion of the local area with light. The light from the illuminator 140 may include structured light (e.g., a dot pattern or bar pattern) in a non-visible (e.g., infrared) spectrum. In some embodiments, the one or more imaging devices 130 capture images of the illuminated portion of the local area. FIG. 1A shows a single illuminator 140 and two imaging devices 130. In alternate embodiments, there at least two imaging devices but no illuminator.

The DCA controller computes depth information for the illuminated portion of the local area using the captured images and one or more depth determination techniques. The depth determination techniques may, for example, include direct time-of-flight (ToF) depth sensing, indirect ToF depth sensing, structured light sensing, passive stereo analysis, active stereo analysis (using texture added to the scene by light from the illuminator 140), some other technique to determine the depth of a scene, or some combination thereof.

The audio system of headset 100 may include a transducer array, an acoustic sensor array, and an audio controller 150. The audio system may provide audio content using the transducer array, which may include a set of speakers 160 (e.g., a separate speaker for each ear). However, in other embodiments, the audio system may include different and/or additional components. Similarly, in some cases, functionality described with reference to the components of the audio system can be distributed among the components in a different manner than is described here. For example, some or all of the functions of the audio controller in FIG. 1A (or other examples illustrated herein) may be performed by a remote server.

Audio controller 150 processes information from the sensor array that describes sounds captured by the sensor array. The audio controller 150 may include a processor and a computer-readable storage medium. The audio controller 150 may be configured to generate direction of arrival (DOA) estimates, generate acoustic transfer functions (e.g., array transfer functions (ATFs) and/or head-related transfer functions (HRTFs)), track the locations of sound sources, form beams in the direction of sound sources, classify sound sources, generate sound filters for filtering audio content to be presented through the speakers 160, or some combination thereof. The functions of the audio controller 150 are described in more detail with respect to FIGS. 2-5.

The transducer array presents sound to the user. The transducer array includes a plurality of transducers. A transducer may be a speaker 160 or a tissue transducer 170 (e.g., a bone conduction transducer or a cartilage conduction transducer). The speakers 160 may be located external to the frame 110 or enclosed within the frame 110. In some embodiments, instead of individual speakers for each ear, the headset 100 includes a speaker array comprising multiple speakers integrated into the frame 110 to improve the directionality of presented audio content. The tissue transducer 170 couples to the head of the user and directly vibrates tissue (e.g., bone or cartilage) of the user to generate sound. The number and/or locations of transducers may be different from what is shown in FIG. 1A.

The sensor array captures sound within the local area (e.g., a room) of the headset 100. The sensor array includes a plurality of acoustic sensors 180. An acoustic sensor 180 captures sounds emitted from one or more sound sources in the local area. The one or more sound sources may be in the far field (e.g., a noise source, a person speaking, etc.), the near field (e.g., a voice of the user), or some combination thereof. Each acoustic sensor is configured to capture sound and convert the captured sound into an electronic format (analog or digital). The acoustic sensors 180 may be acoustic wave sensors, microphones, contact microphones, sound transducers, voice activity detectors (VADs), or similar sensors that are suitable for capturing sounds and/or vibrations.

In some embodiments, one or more acoustic sensors 180 may be placed in an ear canal of each ear (e.g., acting as binaural microphones). In some embodiments, the acoustic sensors 180 may be placed on an exterior surface of the headset 100, placed on an interior surface of the headset 100, separate from the headset 100 (e.g., part of some other device), or some combination thereof. The number and/or locations of acoustic sensors 180 may be different from what is shown in FIG. 1A. For example, the number of acoustic capture locations may be increased to increase the amount of audio information collected and the sensitivity and/or accuracy of the information. The acoustic capture locations may be oriented such that the microphone is able to capture sounds in a wide range of directions surrounding the headset 100.

The position sensor 190 generates one or more measurement signals in response to motion of the headset 100. The position sensor 190 may be located on a portion of the frame 110. The position sensor 190 may include an inertial measurement unit (IMU). Examples of position sensor 190 include: one or more accelerometers, one or more gyroscopes, one or more magnetometers, another type of sensor that detects motion, a sensor used for error correction of the IMU, or some combination thereof.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more RGB (red, green, blue) cameras that capture images of some or all of the local area. In some embodiments, at least some of the imaging devices 130 of the DCA may also function as the PCA. The images captured by the PCA and the depth information determined by the DCA may be used to determine parameters of the local area, generate a model of the local area, update a model of the local area, or some combination thereof. Furthermore, the position sensor 190 tracks the position (e.g., location and pose) of the headset 100 within the room. The images captured by the headset 100 may be used to determine the locations of sound sources in the local area. Additional details regarding the components of the headset 100 are discussed below in connection with FIG. 6.

Figure 1B:
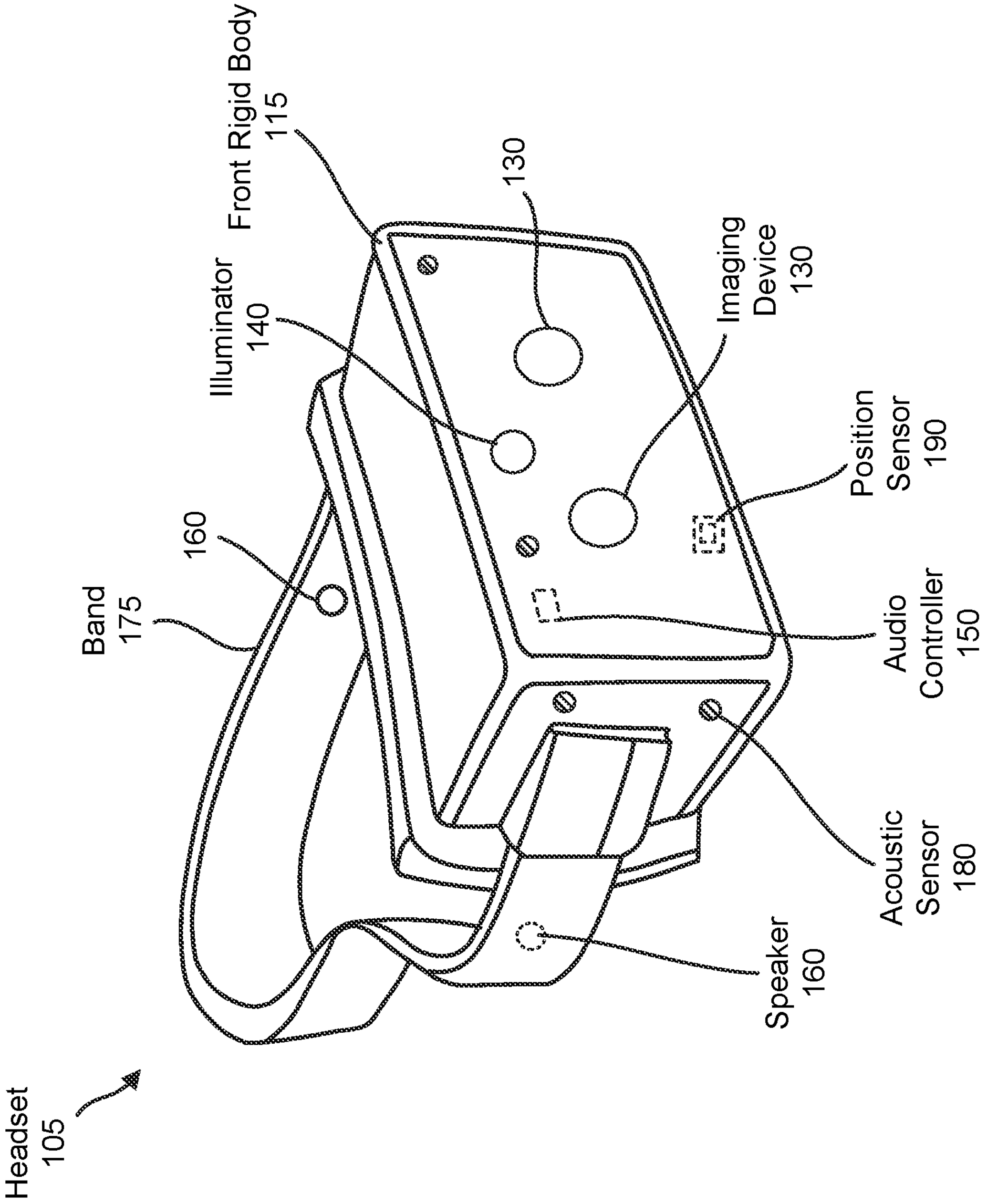
FIG. 1B is a perspective view of a headset implemented as a head-mounted display, in accordance with one or more embodiments.

FIG. 1B is a perspective view of a headset 105 implemented as a head-mounted display (HMD), in accordance with one or more embodiments. In embodiments featuring an AR system and/or an MR system, portions of a front side of the HMD are at least partially transparent in the visible spectrum (approximately 380 nm to 750 nm), and portions of the HMD that are between the front side of the HMD and an eye of the user are at least partially transparent (e.g., a partially transparent electronic display). The HMD includes a front rigid body 115 and a band 175. The headset 105 includes many of the same components described above with reference to FIG. 1A but modified to fit the HMD form factor. For example, the headset 105 may include a display assembly, a DCA, an audio system including an audio controller 150, and a position sensor 190. FIG. 1B shows the illuminator 140, speakers 160, imaging devices 130, acoustic sensors 180, and position sensor 190. The speakers 160 may be located in various locations, such as coupled to the band 175 (as shown), coupled to front rigid body 115, or may be configured to be inserted into an ear canal of a user.

Figure 2:
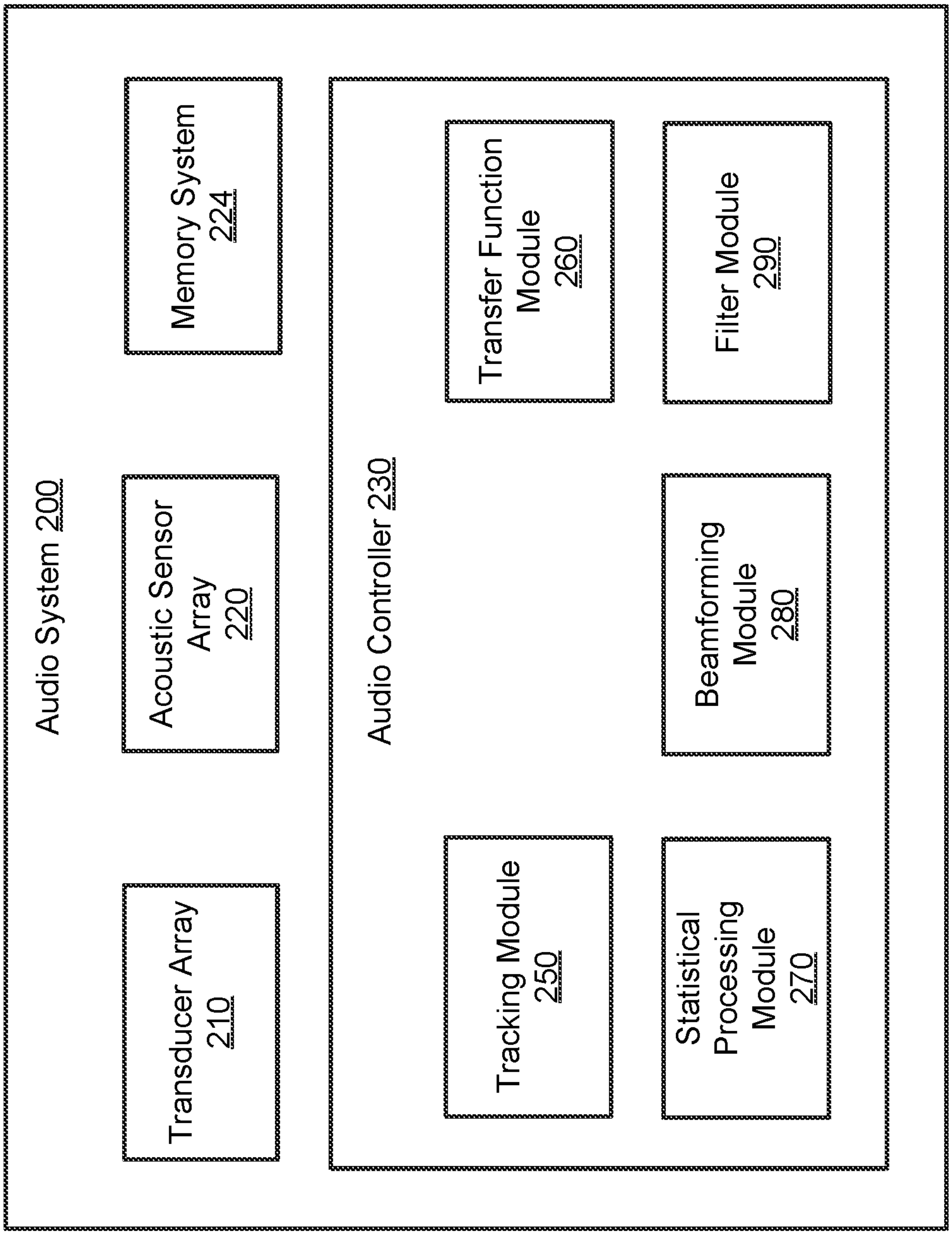
FIG. 2 is a block diagram of an audio system, in accordance with one or more embodiments.

FIG. 2 is a block diagram of an audio system 200, in accordance with one or more embodiments. The audio system 200 may be integrated into a wearable device (e.g., a headset). For example, the audio system in FIG. 1A or FIG. 1B may be an embodiment of the audio system 200. Accordingly, functionality described with respect to elements of FIGS. 1A and 1B may also be present in corresponding elements of FIG. 2. For the sake of brevity, the discussion of such functionality is not repeated. In the example of FIG. 2, the audio system 200 includes a transducer array 210, an acoustic sensor array 220, a memory system 224, and an audio controller 230. Some embodiments of the audio system 200 may have different components than those described here. Similarly, in some cases, functions can be distributed among the components in a different manner than is described here.

Transducer array 210 is configured to present audio content to a user of the audio system 200 in accordance with instructions from the audio controller 230. In some embodiments, the audio content is spatialized. Spatialized audio content is audio content that appears to originate from a particular direction and/or region (e.g., a physical object in the local area and/or a virtual object). The transducer array 210 includes a plurality of transducers. A transducer of the transducer array 210 may be a speaker (e.g., speaker 160) or a tissue transducer (e.g., tissue transducer 170). Like the examples in FIGS. 1A and 1B, the transducer array 210 may include individual speakers for each ear of the user or a speaker array with multiple speakers.

The audio controller 230 may control the transducer array 210 to present different types of audio content. In some instances, the presented audio content may be pre-recorded sound (e.g., a song from a music playlist). In other instances, the presented audio content may be generated by the audio system 200 based on sound captured using the sensor array 220. For example, as discussed below, the audio content may include sound from a target sound source that is captured, along with sound from other sound sources, by the sensor array 220. The audio controller 230 may generate audio content using one or more acoustic transfer functions (e.g., an ATF associated with a target sound source). Further, as discussed below, the audio controller 230 is configured to determine which portions of captured sound originate from various sound sources (e.g., using DOA or a voice activity detector) and generate one or more sound filters to enhance (e.g., amplify) sound from a target sound source while suppressing the voice of the user.

Sensor array 220 captures sound within a local area of the audio system 200. The sensor array 220 includes a plurality of acoustic sensors (e.g., acoustic sensors 180) that each capture air pressure variations of a sound wave and convert the captured sounds into an electronic format (analog or digital). The plurality of acoustic sensors may be positioned on a wearable device (e.g., headset 100 or headset 105), on a user (e.g., in an ear canal of the user), on a neckband, or some combination thereof.

Sound sources may be in the far field (e.g., a noise source, another person speaking, etc.), the near field (e.g., the voice of the user), or some combination thereof. For example, the sensor array may capture sound from the local area, where the captured sound includes noise from the local area (e.g., ambient noise), sound from a target sound source, the voice of the user, or some combination thereof. A target sound source is a sound source that the user and/or the audio system has designated for enhancement. For example, during a conversation with a second person, the user may indicate that the second person is a target sound source. There can be more than one target sound source at any given time.

The user may designate a target sound source using one or more user input devices, which may be part of the audio system 200 and/or an external system (e.g., another component of a wearable device that houses the audio system 200). For example, the wearable device may include an eye tracking system, and the user may provide an input (e.g., gesture, voice command, button selection, etc.) while the user is looking at the sound source to be designated as the target sound source. In other embodiments, the audio system 200 and/or external system may automatically designate one or more target sound sources. For example, the audio system 200 may designate a particular sound source as a target sound source if the user is looking at the sound source for more than a threshold period of time. In some embodiments, a target sound source may be determined based on trained models that incorporate conversational dynamics and observations of people in conversations, such as behavior, head movement, eye movement, or language context. At least one of the people participating in the conversations may be a user of a wearable device including the audio system 200.

Sound from a non-target sound source is considered noise. To improve the user's listening experience, it is often desirable to suppress (e.g., at least partially attenuate) noise in the local area. In some instances, the user's own voice acts as a noise source. For example, in the absence of own-voice suppression, the audio system 200 could potentially amplify the user's own voice as captured by the sensor array 220. This can interfere with the user's ability to hear the target sound source. Further, it can be quite jarring when the user's own voice is amplified, as the user may not be expecting to hear their own voice being presented back so suddenly and/or loudly. As discussed in further detail below, an audio controller of an audio system (e.g., the audio controller 230) can reduce own-voice amplification through applying sound filters that are generated based on information about the target sound source (e.g., speech or other vocalizations from another person) and further based on information about noise (e.g., the user's own voice or ambient noise). Different filters may be applied at various times (e.g., to different portions of the audio content) for an improved listening experience.

Memory system 224 is a subsystem for storing data and/or instructions used by the audio system 200. For example, the memory system 224 may store instructions executed by the audio controller 230 in connection with own-voice suppression. Additionally or alternatively, the memory system 224 may include buffer memory, cache memory, or other working memory for the audio controller 230. In some embodiments, the memory system 224 may provide for temporary storage of signals, including signals representing sound recordings (e.g., signals from the sensor array). Further, the memory system 244 may provide storage for audio content, acoustic transfer functions (e.g., ATFs and/or HRTFs), sound source locations, direction of arrival estimates, a virtual model of the local area, and/or other data relevant to the operation of the audio system 200. Accordingly, the memory system 224 may include different types of memory devices that are arranged in a centralized or distributed fashion. For example, the memory system 224 can include a local memory of the audio controller 230.

Audio controller 230 processes information from the sensor array that describes sounds captured by the sensor array 220. Such information may be in the form of analog and/or digital signals produced by the sensor array 220 in response to sound. The audio controller 230 can be implemented using one or more processors, e.g., a central processing unit (CPU), a microcontroller, an application-specific integrated circuit (ASIC), a field-programmable gate array (FPGA), and/or the like. As shown in FIG. 2, the audio controller 230 may include various modules, such as a tracking module 250, a transfer function module 260, a statistical processing module 270, a beamforming module 280, and a filter module 290. Each of these modules can be implemented in hardware, software (including firmware), or both hardware and software. In some embodiments, the memory system 224 may include a non-transitory computer-readable storage medium storing instructions (e.g., compiled program code) which, when executed by the one or more processors of the audio controller 230, cause the audio controller to perform steps implementing some or all of the above-listed modules. Alternatively or additionally, at least some of the modules may be implemented in hardware using, for example, an analog-to-digital converter, a filter circuit, a comparator circuit, a beamformer circuit, a Fast Fourier Transform (FFT) circuit, a covariance matrix computation processor, and/or the like. In some embodiments, the audio controller 230 may be a system-on-chip (SOC) integrated circuit.

Tracking module 250 is configured to localize sound sources in the local area. Localization is a process of determining where sound sources are located relative to the user of the audio system 200. As such, the tracking module 250 (or a separate module) may be configured to estimate the direction of arrival (DOA) of sound sources based on spatial, temporal, and/or spectral analysis of sound captured by the sensor array 220. For instance, the tracking module 250 may apply one or more algorithms to analyze the intensity (e.g., signal amplitude), frequency distribution, and/or arrival time of each sound at the sensor array 220 to determine the direction from which the sound originated.

In some embodiments, DOA is estimated using delay and sum algorithms where an input signal is sampled, and the resulting weighted and delayed versions of the sampled signal are averaged together to determine a DOA. A least mean squares (LMS) algorithm may also be implemented to identify, for example, differences in signal intensity or differences in time of arrival. These differences may then be used to estimate DOA.

In some embodiments, DOA is estimated by decomposing the input signals into their frequency components and selecting specific bins within the time-frequency domain to process. Each selected bin may be processed to determine whether that bin includes a portion of the audio spectrum with a direct path audio signal. Those bins having a portion of the direct-path signal may then be analyzed to identify the angle at which the sensor array 220 received the direct-path audio signal. The determined angle may then be used to identify the DOA for the received input signal. Other algorithms may also be used alone or in combination with the above-described algorithms to determine DOA.

DOA may be expressed in terms of angular information (e.g., azimuth and elevation). In some embodiments, the tracking module 250 may estimate DOA with respect to an absolute or relative position of the audio system within a coordinate system. The coordinate system may be a spherical coordinate system, a Cartesian coordinate system, or some other type of coordinate system. For example, the tracking module 250 may estimate x-y-z coordinates of a sound source relative to the audio system 200, the local area, or a global coordinate system (e.g., global positioning system (GPS) coordinates). The tracking module 250 may receive positioning information from an external source (e.g., an artificial reality console, a mapping server, or a position sensor such as the position sensor 190). The positioning information may include location and/or orientation information to inform the tracking module 250 about, or assist the tracking module 250 in determining, locations of sound sources and devices within the local area. For example, the positioning information may include a location and/or orientation of some or all of the audio system 200

(e.g., of the sensor array 220). The tracking module 250 may update the estimated DOA based on the positioning information.

The tracking module 250 may compare current DOA estimates with historical DOA estimates to determine whether a sound source has moved. In addition to using the sensor array 220, the tracking module 250 may use information from other types of sensors (e.g., images from one or more imaging devices 130) to localize sound sources. The additional sensor information may be received from the wearable device or some other external source. Thus, the tracking module 250 may detect a change in the location of a sound source based on visual information (e.g., using a computer vision algorithm) and/or other information from a non-acoustic sensor. The tracking module 250 may record changes in the location of each sound source and keep track of the total number of sound sources at any given time.

Transfer function module 260 is configured to generate one or more acoustic transfer functions (e.g., ATFs and/or HRTFs) based on parameters of the captured sounds. Generally, a transfer function is a mathematical function giving a corresponding output value for each possible input value. An ATF characterizes how an acoustic sensor (e.g., a microphone in a microphone array) receives sound from a point in space. By contrast, an HRTF characterizes how a person's ear receives sound from a point in space.

Each ATF generated by the transfer function module 260 may include a number of transfer functions that characterize a relationship between a particular sound source and the corresponding sound received by the acoustic sensors in the sensor array 220. For any given sound source, there is a corresponding transfer function for each of the acoustic sensors in the sensor array 220. Collectively, the set of transfer functions is referred to as an ATF. Thus, each sound source is associated with a corresponding ATF. For example, the transfer function module 260 may generate an ATF associated with a target sound source (e.g., a person or object in the local area), the user, or a transducer of the transducer array 210.

The ATF for a particular sound source location relative to the sensor array 220 may differ from user to user due to a person's anatomy (e.g., ear shape, shoulders), since anatomy affects sound as it travels to the acoustic sensors of the sensor array 220. Similarly, the HRTF for a particular sound source location relative to a person depends on the person's anatomy since anatomy affects sound as it travels to the person's ears. Accordingly, the ATFs and/or HRTFs generated by the transfer function module 260 may be personalized for each individual user of the audio system 200.

In some embodiments, an acoustic transfer function for a target sound source (also referred to herein as a "target transfer function") may be pre-determined/measured/simulated as a free-field ATF that is then loaded from a dictionary of different directions to point in the direction of the target sound source. Accordingly, the transfer function module 260 may obtain the target transfer function from memory.

In some embodiments, the transfer function module 260 may adaptively estimate the target transfer function as being the dominant eigenvector of a covariance matrix that contains the target source at a dominant level compared to other sounds (or any other eigenvector associated with the target sound source).

Statistical processing module 270 is configured to perform statistical analysis of sound captured by the sensor array 220. The analysis may include determining statistical properties of sound sources to characterize changes in the sounds produced by the sound sources, e.g., as a function of time, space, and/or frequency. In particular, the statistical processing module 270 is configured to determine a first set of statistical properties associated with ambient noise, and a second set of statistical properties associated with the voice of the user. As discussed in further detail below, the audio system 200 can use these two sets of statistical properties to generate sound filters for enhancing a target sound source and suppressing the voice of the user. The statistical processing module 270 may periodically update the statistical properties at appropriate times based on newer sound samples.

In some embodiments, the statistical analysis is performed at least partly in the frequency domain. For example, each acoustic sensor may be associated with a first plurality of corresponding matrices describing ambient noise for different acoustic frequencies. Therefore, the statistical processing module 270 can combine the first plurality of matrices to determine and/or update the first set of statistical properties. Similarly, each acoustic sensor may be associated with a second plurality of corresponding matrices describing the voice of the user for different acoustic frequencies. Therefore, the statistical processing module 270 can combine the second plurality of matrices to determine and/or update the second set of statistical properties.

The two sets of statistical properties are independent from each other and may be updated differently and at different times. For instance, the first set of statistical properties is determined/updated based in part on portions of the captured sound that do not include the voice of the user (e.g., audio frames where the user is silent). In some embodiments, the portions of captured sound used to determine the first set of statistical properties may be further limited to portions that do not include a target sound source (e.g., audio frames where the target sound source is silent). Thus, the first set of statistical properties may be updated at times when both the user's voice and the target sound source are inactive. Alternatively, in some embodiments, the first set of statistical properties can be updated when the user's voice is active, so long as the target sound source is inactive during those times.

Whether or not the voice of the user (or another person) is present may be determined based on input from the sensor array 220 and/or the tracking module 250. In some embodiments, the audio controller 230 may determine the presence of a person's voice (e.g., speech from the user or another person) based on an output signal of a VAD. As discussed above in connection with FIG. 1A, VADs may be included in a sensor array. In some embodiments, the audio controller 230 may itself perform the voice activity detection. Therefore, the audio controller 230 is able to update the second set of statistical properties in response to determining that the voice of the user is present in the captured sound.

In some embodiments, the two sets of statistical properties are properties representing the covariance of their respective sound sources, i.e., ambient noise covariance and own-voice covariance. Each set of statistical properties may be expressed as a covariance matrix. The statistical processing module 270 may compute the covariance matrix between signals from the sensor array 220 (e.g., a matrix representing the spatial covariance of ambient noise across different acoustic sensors). Accordingly, the statistical processing module 270 can maintain an ambient noise covariance matrix and a separate own-voice covariance matrix. In some embodiments, the covariance matrices may be tracked using different update methods and update rates (e.g. different recursive averaging temporal rates).

The rate at which the first set of statistical properties is updated may differ from that of the second set of statistical properties. For example, during own-voice activity, the own-voice covariance (i.e., the second set of statistical properties) can be updated using a long-term recursive smoothing algorithm. The updating of the ambient noise covariance may also be recursive but is typically done at a faster rate than the own-voice covariance. However all update rates can be tuned fast or slow, e.g., according to user preference or through training to automatically adapt the update rates to the speech behavior of the user.

Beamforming module 280 is configured to process one or more ATFs to selectively emphasize sounds from certain locations while de-emphasizing sounds from other locations. In particular, the beamforming module 280 may combine information from different acoustic sensors to emphasize sound from a particular region of the local area while de-emphasizing sound from other regions. The beamforming module 280 may isolate an audio signal associated with a particular sound source from other sound sources in the local area based on, e.g., different DOA estimates from the tracking module 250. In some instances, the beamforming module 280 may enhance sound from a target sound source. For example, the beamforming module 280 may apply sound filters which eliminate signals above, below, or between certain frequencies in order to emphasize the target sound source relative to other sound sources.

The beamforming module 280 may include a minimum variance distortionless response (MDVR) beamformer that adaptively computes weight factors for tuning a directional response (e.g., a microphone polar pattern) of the sensor array 220. The MDVR beamformer tunes the direction response to preserve gain in the direction of arrival of a target sound source and attenuate interference (e.g., noise) from other directions. If a noise source and a target sound source are uncorrelated, as is typically the case, then the variance of the audio signals corresponding to the captured sound may be the sum of the variances of the target signal and the noise. The MVDR beamformer seeks to minimize this sum, thereby mitigating the effect of the noise.

Filter module 290 is configured to generate one or more sound filters. In some embodiments, the sound filters cause the audio content to be spatialized such that the audio content appears to originate from a target region. The filter module 290 may use acoustic transfer functions and/or acoustic parameters to generate the sound filters. In particular, the filter module 290 is configured to generate and/or update one or more sound filters based on the statistical properties determined by statistical processing module 270, i.e., the first set of statistical properties associated with noise and/or the second set of statistical properties associated with the voice of the user. For example, the filter module 290 may generate and/or update a first set of one or more sound filters based on a target transfer function (e.g., an ATF associated with the DOA of a target sound source), the first set of statistical properties, and a modified (e.g., weighted) version of the second set of statistical properties. The modified version of the second set of the statistical properties can be based on a calibrated ratio, discussed below. The first filter set operates in part to enhance the target sound source. As discussed below, the first filter set may also provide a limited degree of own-voice suppression. The first filter set can be applied during the beginning portion of presented audio content that includes the voice of the user. In this manner, the first filter set can help mitigate the voice of the user from being overly amplified in a first or initial set of audio frames of the presented audio content. This may prevent the voice of the user from sounding jarring during the first few frames in a sequence of audio frames featuring the user's voice.

Further, the filter module 290 may generate and/or update a second set of one or more sound filters based on the target transfer function and the second set of statistical properties, but without using the first set of statistical properties. The second filter set operates in part to provide greater (e.g., maximal) suppression of the user's own voice. The second filter set can be applied during remaining audio frames that include the user's voice (i.e., after applying the first filter set to the initial set of audio frames). Alternatively, the first filter set and the second filter set can be applied in the opposite order, with the second filter set being applied to a first set of audio frames, and the first filter set being applied to a second set of audio frames that follows the first set of audio frames.

The sound filters generated by the filter module 290 can be applied at different times or during different stages of audio signal processing. For example, as discussed below in reference to FIG. 4, a filter generated based on statistical properties can be applied as part of generating audio content based on signals from the sensor array 220 and/or as a post-filter after the audio content has been generated. Accordingly, in certain embodiments, the first filter set and/or the second filter set described above may be applied in conjunction with the beamforming performed by the beamforming module 280.

There are two (potentially different) covariances that are associated with noise, and which can be used to generate a sound filter (e.g., for spatialization or beamforming). The two covariances are expressed as follows:

(1) $\alpha\times$[ambient noise covariance matrix]+$(1-\alpha)\times$[own voice covariance matrix], and (2) ambient noise covariance matrix only.

Here, $\alpha$ is a ratio whose value ranges from 0 to 1. The value of $\alpha$ controls the relative weights of the ambient noise covariance and the own-voice covariance in expression (1). In some embodiments, $\alpha$ is determined through subjective studies of one or more users to identify a value of a that minimizes the noticeable effect of own-voice feedback. Hence, $\alpha$ is also referred to herein as the "calibration ratio." The studies may be historical studies performed on a population of users (e.g., users of different instances of a wearable device and/or multiple users of the same wearable device). In some cases, calibration may be performed based on input from the user for whom the audio system 200 is generating audio content (i.e., the current user). For example, an initial value of $\alpha$ may be determined through a clinical trial with hundreds or thousands of users. The value of $\alpha$ may then be adjusted up or down to personalize the calibration ratio for a specific user (e.g., the owner of a wearable device).

As discussed above, the first filter set is based in part on a modified version of the second set of statistical properties. Accordingly, it will be understood that the filter module 290 can generate the first filter set using the target transfer function, plus the ambient noise covariance and own-voice covariance as weighted according to expression (1). Further, the filter module 290 can generate the second filter set using the target transfer function in combination with the own-voice covariance, but not the ambient noise covariance. If the own-voice covariance is weighted at one hundred percent for purposes of generating the second filter set, this is equivalent to setting $\alpha$ to 0 in expression (1).

In summary, the audio controller 230 is configured to generate sound filters and apply the sound filters to one or more audio signals (e.g., an audio signal representing a result of beamforming) to generate audio content. For example, an audio signal corresponding to the captured sound may include frames featuring the voice of the user and ambient noise, frames featuring sound from a target sound source and ambient noise, frames featuring only ambient noise, and frames featuring sound from a target sound source, ambient noise, and the voice of the user. The audio controller 230 may apply the first filter set to a first (e.g., initial) set of frames including the voice of the user and the second filter set to a second (e.g., remaining) set of frames that include the voice of the user, in order to suppress the voice of the user in the audio content. The second set of frames can be located before or after the first set of frames. Additionally, the audio controller 230 may apply the sound filters to frames that include sound from the target sound source to enhance sound from the target sound source. The audio controller 230 may then instruct the transducer array 210 to present the audio content to the user. In this manner, the voice of the user and other sources of noise can be suppressed in the audio being played back to the user, while enhancing sound from the target source.

Note, conventional audio systems may simply include the voice of the user in a same set of statistical properties as noise. That is, conventional audio systems do not differentiate between the user's voice and other noise sources. This results in an initial amplification of the user's voice which is slowly mitigated as the conventional audio system learns how to treat the user's voice, based on overall noise. However, if the user does not speak for a while, conventional audio systems will update their single set of statistical properties using the detected noise from the local area, which over time basically results in the conventional audio system "forgetting" how to properly suppress the voice of the user. As such, the next time the user speaks, the user's voice will once again be amplified in the audio content being presented to the user.

In contrast, the audio system 200 maintains two separate sets of statistical properties, a first set for noise and a second set for a voice of the user. As a result of applying these two sets of statistical properties, the initial onset of the user's voice is significantly less jarring due to pre-mixing to include a partially suppressed version of the user's voice during initial audio frames. Further reduction in the user's voice after the initial audio frames is much faster to reach a lower level (e.g., a level corresponding to maximal suppression) due applying the second set of statistical properties without also applying the first set of statistical properties (e.g., switching to pure own-voice covariance). The difference in perceived own-voice level over the course of the initial and subsequent audio frames is much less and has lower variance, resulting in a more pleasant listening experience relative to conventional audio systems.

Figure 3:
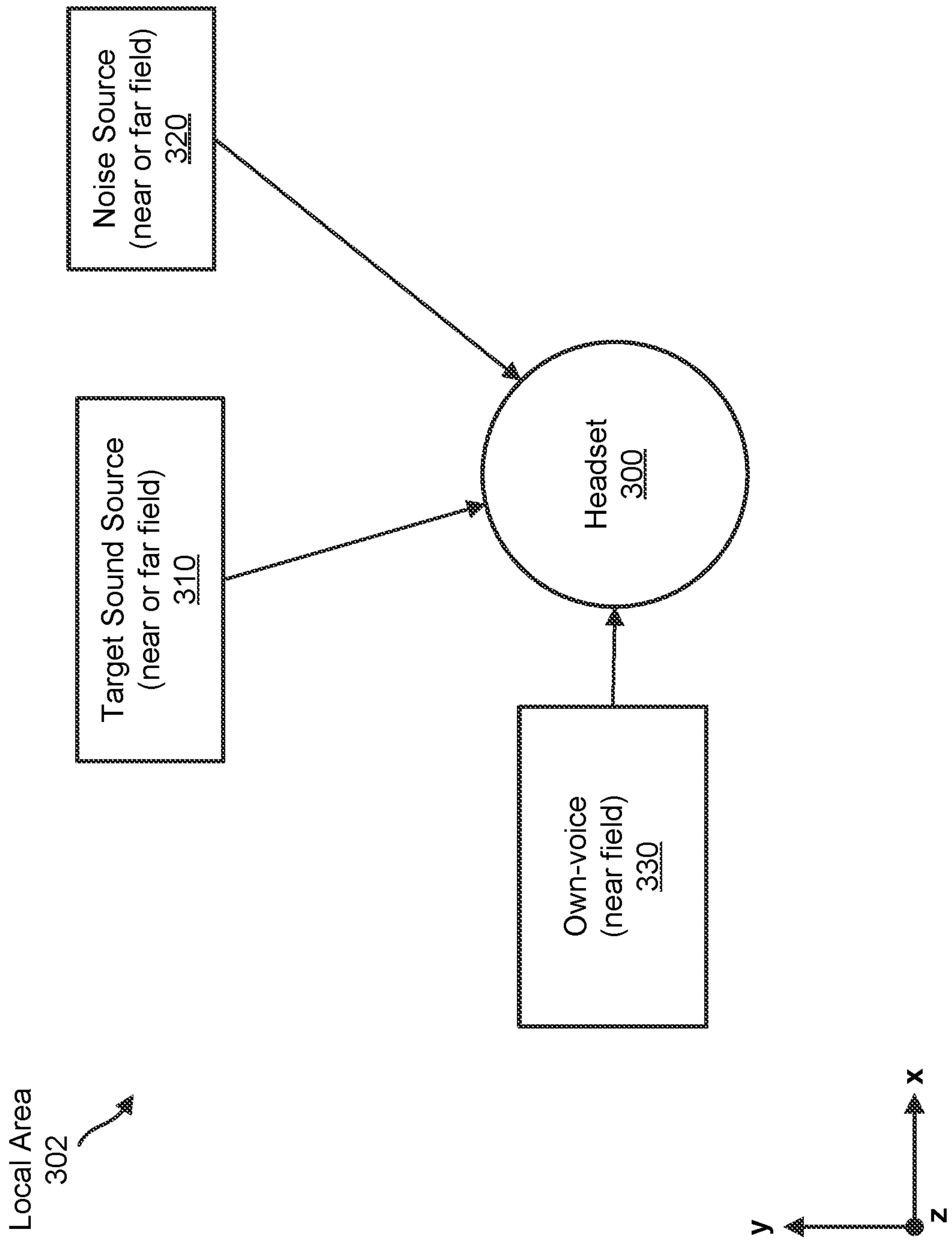
FIG. 3 illustrates an example of sound sources in a local area of an audio system.

FIG. 3 illustrates an example of sound sources in a local area 302 of an audio system. In this example, the audio system is integrated into a headset 300 and may, for example, correspond to the audio system 200 of FIG. 2. The local area 302 includes the physical environment around the headset 300, which could be an indoor space (e.g., a room in a building) or an outdoor space. The local area 302 may change as the user of the audio system (i.e., the person wearing the headset 300) moves around. As shown in FIG. 3, there can be multiple sound sources in the local area 302, including a target sound source 310 (e.g., another person), a noise source 320, and the user's own voice 330.

The distances between the sound sources and the headset 300 determine whether a particular sound source is located in the near field or the far field of an acoustic sensor (e.g., sensor array 220) in the audio system. A sound source that is initially in the near field may later become far field, or vice versa, due to movement of the sound source or movement of the user. Thus, the target sound source 310 and the noise source 320 can be either near field or far field. The exception to this is the own-voice 330, which is always near field because the user's voice originates from close proximity to the headset 300. However, in situations where the acoustic sensor is not part of a wearable device, the user's own voice could be detected as a far field sound source.

Over time, the target sound source 310 may move relative to the user such that the direction of arrival of the target sound source 310 changes. As discussed above, the audio system can estimate DOA to determine an appropriate target transfer function for enhancing sound from the target sound source. The noise source 320 corresponds to ambient noise. The ambient noise includes sound sources other than the target sound source 310 and own-voice 330. There can be more than one sound source that contributes to the ambient noise at any point in time. However, only one source of ambient noise (the noise source 320) is shown for simplicity. The audio system of the headset 300 can track the sound sources (e.g., using tracking module 250) to determine which of the sound sources 310, 320, and/or 330 is present at any point in time, thereby enabling the audio system to make appropriate updates to the statistical properties (e.g., covariance) of the sound sources and generate sound filters based on the statistical properties.

Figure 4:
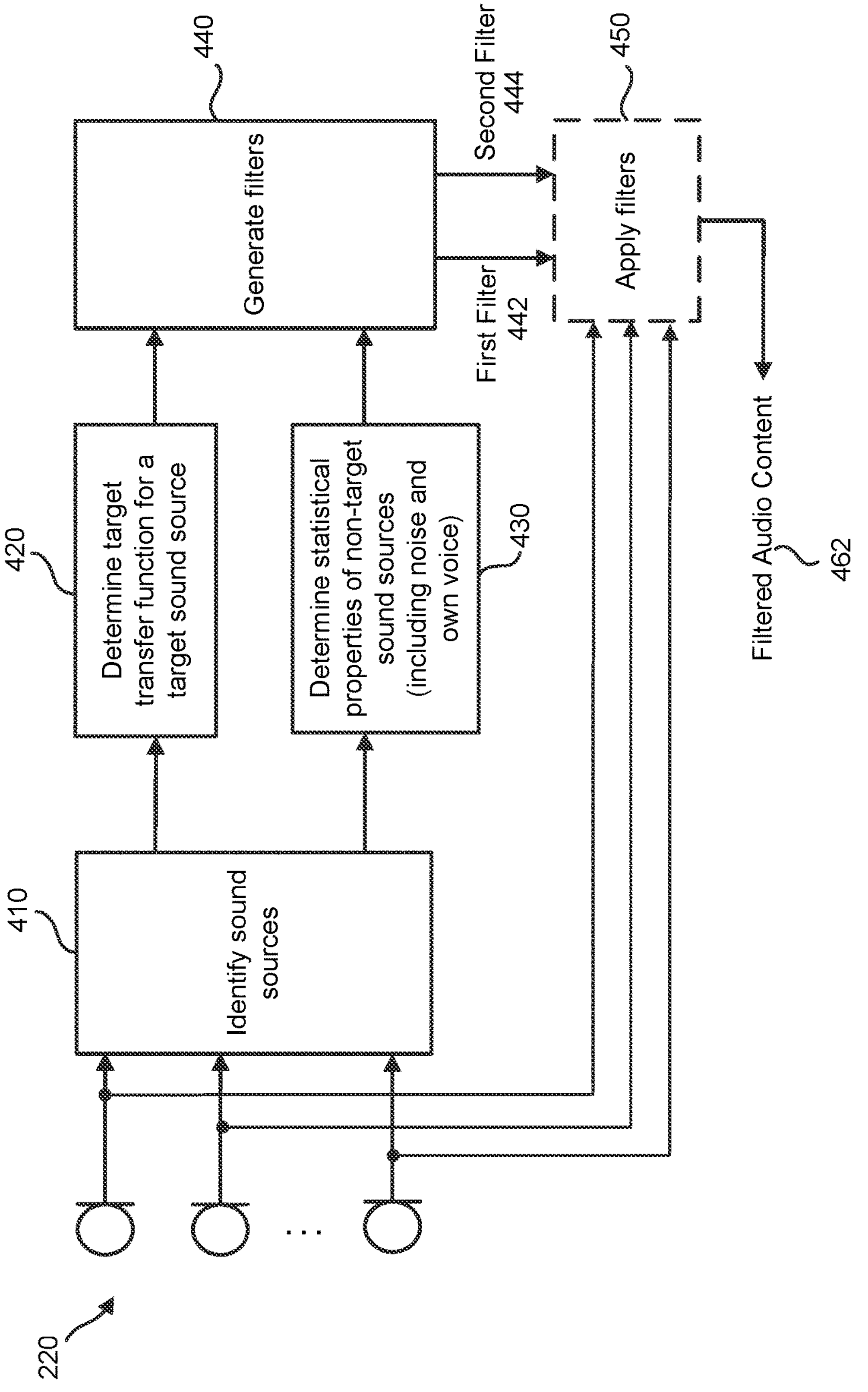
FIG. 4 illustrates signal processing to generate filtered audio content, in accordance with one or more embodiments.

FIG. 4 illustrates signal processing to generate filtered audio content, in accordance with one or more embodiments. The signal processing involves various operations described above in connection with FIG. 2. At 410, sound sources are identified from the audio signals produced by the sensor array 220. The functionality in 410 may include performing DOA estimates and other processing steps to localize and track each sound source.

At 420, a target transfer function is determined for a target sound source, which is one of the sound sources identified in 410.

At 430, statistical properties of non-target sound sources are determined. The non-target sound sources may include ambient noise and the user's own voice. Thus, the statistical properties may include a first set of statistical properties associated with noise and a second set of statistical properties associated with the user's voice. Each set of statistical properties may be combined into a corresponding data structure. For example, as discussed above, the audio controller of the audio system may generate or update an ambient-noise covariance matrix and an own-voice covariance matrix. In some instances, the audio system may also determine statistical properties of the target sound source (e.g., as part of determining the target transfer function in 420).

At 440, the one or more sound filters (e.g., spatial filters) are generated using the target transfer function from 420 and the statistical properties from 430. In particular, the functionality in 440 includes generating a first set of one or more filters (e.g., a first filter 442) and a second set of one or more filters (e.g., a second filter 444). The first filter set and the second filter set can be generated in accordance with the functionality described above with respect to the filter module 290.

At 450, the filters generated in 440 are applied to generate filtered audio content 462 for presentation to the user. The functionality in 450 may involve combining some or all of the audio signals, selecting one or more audio signals, or both, to form an audio signal to which one or more of the filters generated in 440 are applied as a post-filter (e.g., after beamforming). Different filters may be applied at different times (e.g., to different sets of frames, as discussed above). Additionally or alternatively, one or more of the filters generated in 440 may be applied as part of generating the audio content (e.g., during beamforming). In any case, the filtering operation will produce audio content (i.e., the filtered audio content 462) in which sound of the target sound source is enhanced and the user's own voice is suppressed.

Figure 5:
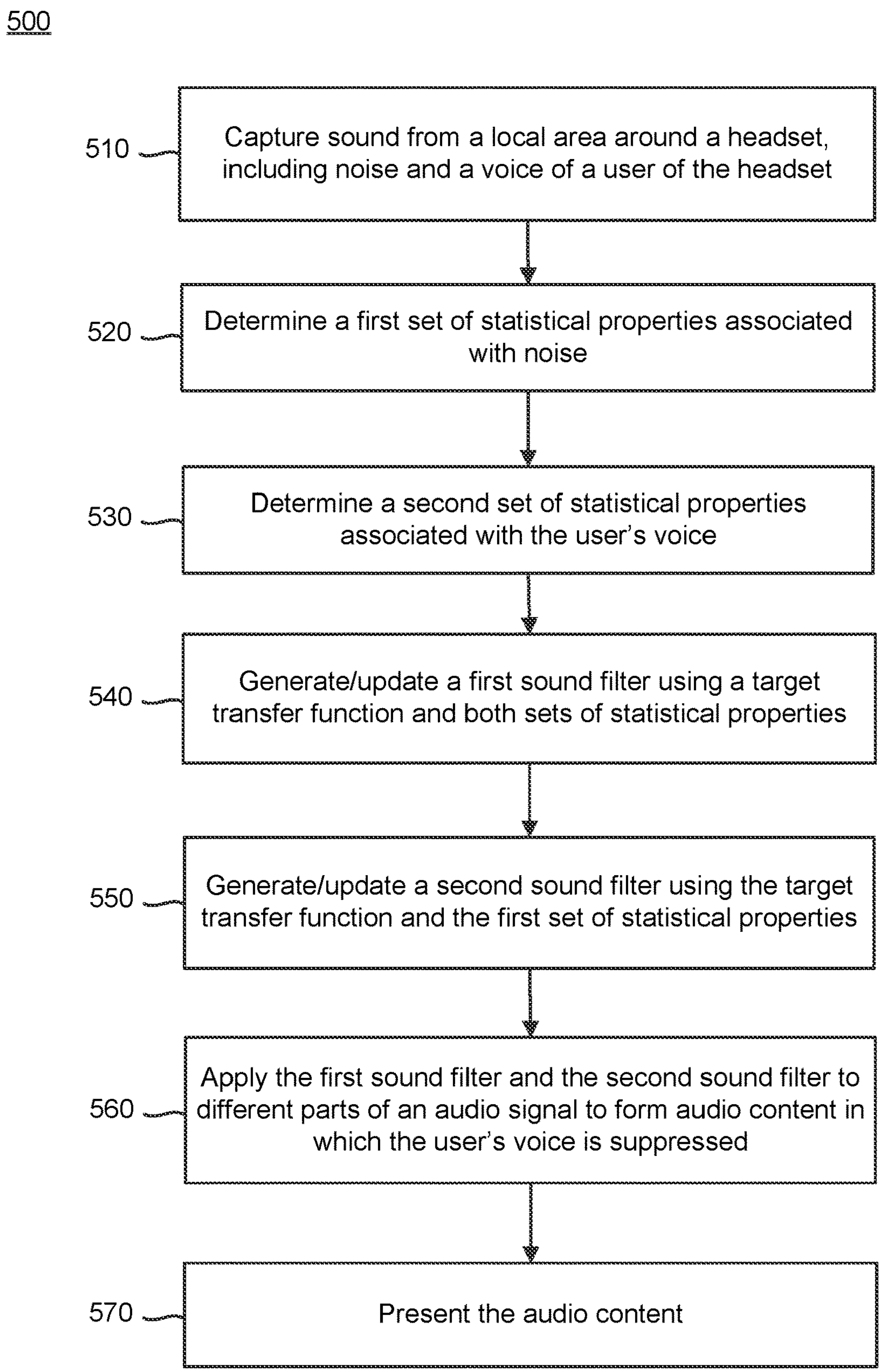
FIG. 5 is a flowchart of a method for own-voice suppression, in accordance with one or more embodiments.

FIG. 5 is a flowchart of a method 500 for own-voice suppression, in accordance with one or more embodiments. The process shown in FIG. 5 may be performed by components of an audio system (e.g., audio system 200). Other entities may perform some or all of the steps in FIG. 5 in other embodiments. Some embodiments may include different and/or additional steps, combine certain steps, or perform the steps in a different order than shown in FIG. 5.

At 510, the audio system captures sound from a local area around a headset. The sound capture may be performed using an acoustic sensor array of the headset. The captured sound includes noise from the local area (e.g., ambient noise) and a voice of a user of headset. The captured sound may also include sound from a target sound source, although not all of these sound sources may be present at the same time. The audio system may operate continuously to capture sound over a period of time such that the user's voice is present in some portions of the captured sound but not present in other portions.

At 520, the audio system determines a first set of statistical properties associated with noise. The first set of statistical properties may, for example, include measurements of the covariance of ambient noise across different sensors of the acoustic sensor array. The functionality in 520 may include updating the first set of statistical properties (e.g., a noise covariance matrix) based on the portions of the captured sound that do not include the voice of the user. In some embodiments, the updating of the first set of statistical properties is further based on portions of the captured sound that do not include sound from the target sound source (e.g., portions in which only ambient noise is present).

At 530, the audio system determines a second set of statistical properties associated with the voice of the user. The second set of statistical properties may, for example, include measurements of the covariance of the user's voice across different sensors of the acoustic sensor array. The functionality in 530 may include updating the second set of statistical properties based on the portions of the captured sound that include the voice of the user (e.g., portions in which only the voice of the user is present).

At 540, the audio system generates or updates a first sound filter using a target transfer function (e.g., an ATF associated with the direction of arrival of the target sound source) in combination with the first set of statistical properties and the second set of statistical properties. For example, the audio system may generate a first set of one or more sound filters based on the target transfer function, an ambient-noise covariance matrix, and an own-voice covariance matrix.

At 550, the audio system generates or updates a second sound filter using the target transfer function in combination with the first set of statistical properties. For example, the audio system may generate a second set of one or more sound filters based on the target transfer function and the own-voice covariance matrix, and without using the ambient-noise covariance matrix. Further, as discussed earlier, both sets of sound filters (e.g., the first sound filter in 540 and the second sound filter in 550) can be generated or updated based on a weighting of the first set of statistical properties relative to the second set of statistical properties, according to the calibration ratio $\alpha$ described in reference to FIG. 2 and expression (1).

At 560, the audio system applies the first sound filter and the second sound filter to different parts of an audio signal to form audio content (e.g., the filtered audio content 462 in FIG. 4) for presentation to the user. The audio signal can be an analog or digital signal and is based on the captured sound. The audio signal may, for example, be derived from one or more signals produced by the acoustic sensor array. The filters are applied such that the voice of the user is suppressed. For example, the first sound filter may be applied to an initial portion of the audio signal (e.g., the first few frames in a sequence of audio frames in which the voice of the user is present) to provide a lower level of own-voice suppression. Further, the second sound filter may be applied to a subsequent portion of the audio signal (e.g., the remaining frames of the sequence of audio frames) to provide a higher (e.g., maximal) level of own-voice suppression. Alternatively, the order in which the sound filters are applied can be reversed, with the second sound filter being applied before the first sound filter.

At 570, the audio content is presented to the user. The audio content can be presented using one or more acoustic transducers (e.g., a left speaker and/or a right speaker). In some instances, different transducer arrangements may be used to simultaneously present the audio content. For example, if the audio system is implemented using the headset 100 in FIG. 1A, the audio content may be presented through both the speaker 160 and the tissue transducer 170.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

Figure 6:
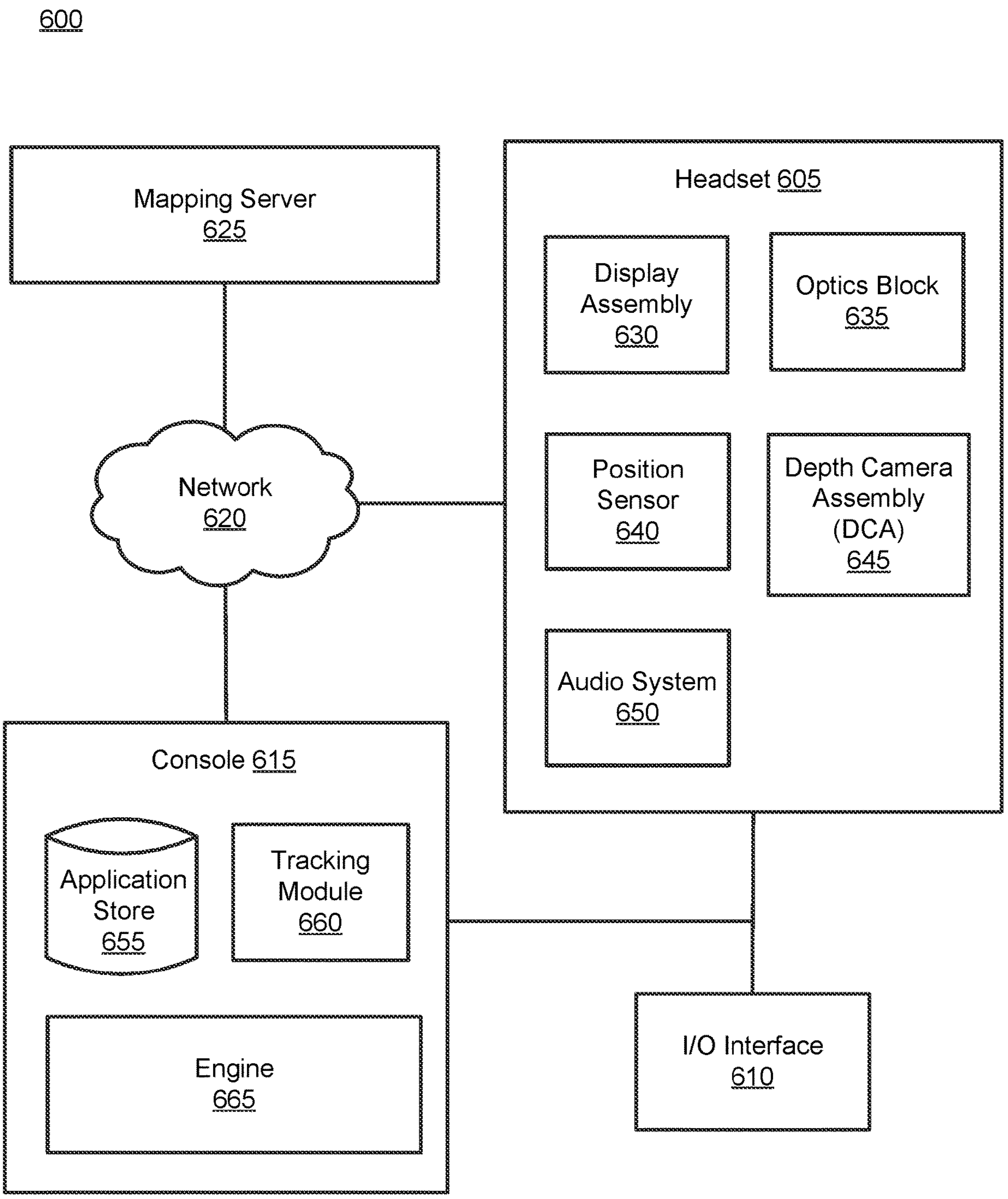
FIG. 6 illustrates a system that includes a headset, in accordance with one or more embodiments.

FIG. 6 illustrates a system 600 that includes a headset 605, in accordance with one or more embodiments. In some embodiments, the headset 605 may be the headset 100 of FIG. 1A or the headset 105 of FIG. 1B. The system 600 may operate in an artificial reality environment (e.g., a VR environment, an AR environment, an MR environment, or some combination thereof). The system 600 further includes an input/output (I/O) interface 610 that is coupled to a console 615, a network 620, and a mapping server 625. While FIG. 6 shows an example system 600 including one headset 605 and one I/O interface 610, in other embodiments any number of these components may be included in the system 600. For example, there may be multiple headsets each having an associated I/O interface 610, with each headset and I/O interface 610 communicating with the console 615. In alternative configurations, different and/or additional components may be included in the system 600. Additionally, functionality described in conjunction with one or more of the components shown in FIG. 6 may be distributed among the components in a different manner than described in conjunction with FIG. 6 in some embodiments. For example, some or all of the functionality of the console 615 may be provided by the headset 605.

The headset 605 includes a display assembly 630, an optics block 635, one or more position sensors 640, and a DCA 645. Some embodiments of headset 605 have different components than those described in conjunction with FIG. 6. Additionally, in other embodiments the functionality provided by various components described in conjunction with FIG. 6 may be differently distributed among the components of the headset 605 or be captured in separate assemblies remote from the headset 605.

The display assembly 630 displays content to the user in accordance with data received from the console 615. The display assembly 630 displays the content using one or more display elements (e.g., the display elements 120). A display element may be, e.g., an electronic display. In various embodiments, the display assembly 630 comprises a single display element or multiple display elements (e.g., a separate display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. In some embodiments, the display assembly 630 may also include some or all of the functionality of the optics block 635.

The optics block 635 may magnify image light received from the electronic display, correct optical errors associated with the image light, and present the corrected image light to one or both eyeboxes of the headset 605. In various embodiments, the optics block 635 includes one or more optical elements. Example optical elements of the optics block 635 include: an aperture, a Fresnel lens, a convex lens, a concave lens, an optical filter, a reflecting surface, or any other suitable optical element that affects image light. Moreover, the optics block 635 may include combinations of different optical elements. In some embodiments, one or more of the optical elements in the optics block 635 may have one or more coatings, such as a partially reflective or anti-reflective coating.

Magnification and focusing of the image light by the optics block 635 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 635 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 635 corrects the distortion when it receives image light from the electronic display generated based on the content.

The position sensor 640 is an electronic device that generates data indicating a position of the headset 605. The position sensor 640 generates one or more measurement signals in response to motion of the headset 605. The position sensor 190 is an embodiment of the position sensor 640. Examples of a position sensor 640 include: one or more IMUs, one or more accelerometers, one or more gyroscopes, one or more magnetometers, another suitable type of sensor that detects motion, or some combination thereof. The position sensor 640 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 605 from the sampled data. For example, the IMU may integrate the measurement signals received from the accelerometers over time to estimate a velocity vector and integrates the velocity vector over time to determine an estimated position of a reference point on the headset 605. The reference point is a point that may be used to describe the position of the headset 605. While the reference point may generally be defined as a point in space, however, in practice the reference point is defined as a point within the headset 605.

The DCA 645 generates depth information for a portion of the local area. The DCA includes one or more imaging devices and a DCA controller. The DCA 645 may also include an illuminator. Operation and structure of the DCA 645 is described above with respect to FIG. 1A.

The audio system 650 provides audio content to a user of the headset 605. The audio system 650 may be an embodiment of the audio system 200 described above. The audio system 650 may comprise one or acoustic sensors, one or more transducers, and an audio controller. The audio system 650 may provide spatialized audio content to the user. In some embodiments, the audio system 650 may request acoustic parameters from the mapping server 625 over the network 620. The acoustic parameters describe one or more acoustic properties (e.g., room impulse response, a reverberation time, a reverberation level, etc.) of the local area. The audio system 650 may provide information describing at least a portion of the local area from e.g., the DCA 645 and/or location information for the headset 605 from the position sensor 640. In addition to generating sound filters based on statistical properties associated with sound sources, the audio system 650 may generate one or more sound filters using one or more of the acoustic parameters received from the mapping server 625, and use the sound filters to provide audio content to the user.

The I/O interface 610 is a device that allows a user to send action requests and receive responses from the console 615. An action request is a request to perform a particular action. For example, an action request may be an instruction to start or end capture of image or video data, or an instruction to perform a particular action within an application. The I/O interface 610 may include one or more input devices. Example input devices include: a keyboard, a mouse, a game controller, or any other suitable device for receiving action requests and communicating the action requests to the console 615. An action request received by the I/O interface 610 is communicated to the console 615, which performs an action corresponding to the action request. In some embodiments, the I/O interface 610 includes an IMU that captures calibration data indicating an estimated position of the I/O interface 610 relative to an initial position of the I/O interface 610. In some embodiments, the I/O interface 610 may provide haptic feedback to the user in accordance with instructions received from the console 615. For example, haptic feedback is provided when an action request is received, or the console 615 communicates instructions to the I/O interface 610 causing the I/O interface 610 to generate haptic feedback when the console 615 performs an action.

The console 615 provides content to the headset 605 for processing in accordance with information received from one or more of: the DCA 645, the headset 605, and the I/O interface 610. In the example shown in FIG. 6, the console 615 includes an application store 655, a tracking module 660, and an engine 665. Some embodiments of the console 615 have different modules or components than those described in conjunction with FIG. 6. Similarly, the functions further described below may be distributed among components of the console 615 in a different manner than described in conjunction with FIG. 6. In some embodiments, the functionality discussed herein with respect to the console 615 may be implemented in the headset 605 or a remote system.

The application store 655 stores one or more applications for execution by the console 615. An application includes instructions that, when executed by a processor, generate content for presentation to the user. Content generated by an application may be in response to inputs received from the user via movement of the headset 605 or the I/O interface 610. Examples of applications include: gaming applications, conferencing applications, video playback applications, or other suitable applications.

The tracking module 660 tracks movements of the headset 605 or the I/O interface 610 using information from the DCA 645, the one or more position sensors 640, or some combination thereof. For example, the tracking module 660 may determine a position of a reference point of the headset 605 in a mapping of a local area based on information from the headset 605. The tracking module 660 may also determine positions of a physical or virtual object. Additionally, in some embodiments, the tracking module 660 may predict a future position of the headset 605.

The engine 665 executes applications and receives position information, acceleration information, velocity information, predicted future positions, or some combination thereof, of the headset 605 from the tracking module 660. Based on the received information, the engine 665 determines content to provide to the headset 605 for presentation to the user. For example, the engine 665 may generate content for the headset 605 that mirrors the user's head movement. Additionally, the engine 665 may perform an action within an application executing on the console 615 in response to an action request and provides feedback to the user that the action was performed. The provided feedback may be visual or audible feedback via the headset 605 or haptic feedback via the I/O interface 610.

The network 520 couples the headset 605 and/or the console 615 to the mapping server 625. The network 620 may include any combination of local area and/or wide area networks using both wireless and/or wired communication systems. For example, the network 620 may include the Internet, as well as mobile telephone networks. In one embodiment, the network 620 uses standard communications technologies and/or protocols. Hence, the network 620 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 620 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), etc. The data exchanged over the network 620 can be represented using technologies and/or formats including image data in binary form (e.g., Portable Network Graphics (PNG)), hypertext markup language (HTML), extensible markup language (XML), etc. In addition, some or all of links can be encrypted using conventional encryption technologies such as secure sockets layer (SSL), transport layer security (TLS), virtual private networks (VPNs), Internet Protocol security (IPsec), etc.

The mapping server 625 may include a database that stores a virtual model describing a plurality of spaces, wherein one location in the virtual model corresponds to a current configuration of a local area of the headset 605. The mapping server 625 receives, from the headset 605 and via the network 620, information describing at least a portion of the local area and/or location information for the local area. The user may adjust privacy settings to allow or prevent the headset 605 from transmitting information to the mapping server 625. The mapping server 625 determines, based on the received information and/or location information, a location in the virtual model that is associated with the local area of the headset 605. The mapping server 625 determines (e.g., retrieves) one or more acoustic parameters associated with the local area, based in part on the determined location in the virtual model and any acoustic parameters associated with the determined location. The mapping server 625 may transmit the location of the local area and any values of acoustic parameters associated with the local area to the headset 605. The mapping server 625 may provide a coordinate system to the audio system 650. The audio system 650 may use the coordinate system to determine coordinates for the headset 605 as well as sound sources and other devices in the local area.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium," as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media such as compact disk (CD) or digital versatile disk (DVD), punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code. A computer program product may include code and/or machine-executable instructions that may represent a procedure, a function, a subprogram, a program, a routine, an application (App), a subroutine, a module, a software package, a class, or any combination of instructions, data structures, or program statements.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and" and "or" as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean A, B, C, or a combination of A, B, and/or C, such as AB, AC, BC, AA, ABC, AAB, ACC, AABBCCC, or the like.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components, or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:

capturing sound from a local area using an acoustic sensor array of a headset, the captured sound including noise from the local area and a voice of a user of the headset;

determining a first set of statistical properties associated with the noise, based on portions of the captured sound that do not include the voice of the user;

determining a second set of statistical properties associated with the voice of the user, based on portions of the captured sound that include the voice of the user;

generating a first sound filter based on a target transfer function, the first set of statistical properties, and the second set of statistical properties;

generating a second sound filter based on the target transfer function and the second set of statistical properties, but not the first set of statistical properties;

applying the first sound filter and the second sound filter to different parts of an audio signal, generated based on the captured sound, to form audio content in which the voice of the user is suppressed; and presenting the audio content to the user.

2. The method of claim 1, wherein the target transfer function is an array transfer function (ATF) associated with a target sound source.

3. The method of claim 2, further comprising:

estimating a direction of arrival of the target sound source; and determining the ATF based on the direction of arrival.

4. The method of claim 1, wherein the first set of statistical properties comprises a first covariance matrix representing a spatial covariance of the noise, and wherein the second set of statistical properties comprises a second covariance matrix representing a spatial covariance of the voice of the user.

5. The method of claim 1, wherein generating the first sound filter comprises weighting the first set of statistical properties relative to the second set of statistical properties.

6. The method of claim 5, wherein a weight of the second set of statistical properties used to generate the first sound filter is less than a weight of the second set of statistical properties used to generate the second sound filter, such that the voice of the user is less suppressed in a part of the audio signal to which the first sound filter is applied compared to a part of the audio signal to which the second sound filter is applied.

7. The method of claim 1, wherein the first sound filter and the second sound filter are applied during beamforming of signals produced by the acoustic sensor array.

8. The method of claim 1, wherein the first sound filter and the second sound filter are applied as post-filters after beamforming of signals produced by the acoustic sensor array.

9. The method of claim 1, wherein:

the audio signal comprises a sequence of audio frames which include the voice of the user, the first sound filter is applied to a first set of frames in the sequence of audio frames, and the second sound filter is applied to a second set of frames in the sequence of audio frames, the second set of frames being located before or after the first set of frames.

10. The method of claim 9, wherein the first sound filter and the second sound filter are generated through weighting the first set of statistical properties relative to the second set of statistical properties.

11. An audio system comprising:

an acoustic sensor array configured to capture sound from a local area, the captured sound including noise from the local area and a voice of a user;

a transducer array; and an audio controller configured to:

determine a first set of statistical properties associated with the noise, based on portions of the captured sound that do not include the voice of the user;

determine a second set of statistical properties associated with the voice of the user, based on portions of the captured sound that include the voice of the user;

generate a first sound filter based on a target transfer function, the first set of statistical properties, and the second set of statistical properties;

generate a second sound filter based on the target transfer function and the second set of statistical properties, but not the first set of statistical properties;

apply the first sound filter and the second sound filter to different parts of an audio signal, generated based on the captured sound, to form audio content in which the voice of the user is suppressed; and present the audio content to the user through the transducer array.

12. The audio system of claim 11, wherein the target transfer function is an array transfer function (ATF) associated with a target sound source.

13. The audio system of claim 12, wherein the audio controller is further configured to:

estimate a direction of arrival of the target sound source; and determine the ATF based on the direction of arrival.

14. The audio system of claim 11, wherein the first set of statistical properties comprises a first covariance matrix representing a spatial covariance of the noise, and wherein the second set of statistical properties comprises a second covariance matrix representing a spatial covariance of the voice of the user.

15. The audio system of claim 11, wherein to generate the first sound filter, the audio controller is configured to weight the first set of statistical properties relative to the second set of statistical properties.

16. The audio system of claim 15, wherein a weight of the second set of statistical properties used to generate the first sound filter is less than a weight of the second set of statistical properties used to generate the second sound filter, such that the voice of the user is less suppressed in a part of the audio signal to which the first sound filter is applied compared to a part of the audio signal to which the second sound filter is applied.

17. The audio system of claim 11, wherein the audio controller is configured to apply the first sound filter and the second sound filter during beamforming of signals produced by the acoustic sensor array.

18. The audio system of claim 11, wherein the audio controller is configured to apply the first sound filter and the second sound filter as post-filters after beamforming of signals produced by the acoustic sensor array.

19. The audio system of claim 11, wherein:

the audio signal comprises a sequence of audio frames which include the voice of the user, the audio controller is configured to apply the first sound filter to a first set of frames in the sequence of audio frames, and the audio controller is configured to apply the second sound filter to a second set of frames in the sequence of audio frames, the second set of frames being located before or after the first set of frames.

20. A non-transitory computer-readable storage medium storing instructions which, when executed by one or more processors of an audio system, cause the audio system to:

capture sound from a local area using an acoustic sensor array, the captured sound including noise from the local area and a voice of a user;

determine a first set of statistical properties associated with the noise, based on portions of the captured sound that do not include the voice of the user;

determine a second set of statistical properties associated with the voice of the user, based on portions of the captured sound that include the voice of the user;

generate a first sound filter based on a target transfer function, the first set of statistical properties, and the second set of statistical properties;

generate a second sound filter based on the target transfer function and the second set of statistical properties, but not the first set of statistical properties;

apply the first sound filter and the second sound filter to different parts of an audio signal, generated based on the captured sound, to form audio content in which the voice of the user is suppressed; and present the audio content to the user.

* * * * *